US008836580B2

(12) United States Patent
Mendelson

(10) Patent No.: US 8,836,580 B2
(45) Date of Patent: Sep. 16, 2014

(54) RF PROXIMITY TAGS PROVIDING INDOOR AND OUTDOOR NAVIGATION AND METHOD OF USE

(76) Inventor: Ehud Mendelson, Coral Springs, FL (US)

( * ) Notice: Subject to any disclaimer, the term of this patent is extended or adjusted under 35 U.S.C. 154(b) by 565 days.

(21) Appl. No.: 11/429,864

(22) Filed: May 8, 2006

(65) Prior Publication Data

US 2007/0001904 A1 Jan. 4, 2007

Related U.S. Application Data

(60) Provisional application No. 60/678,947, filed on May 9, 2005.

(51) Int. Cl.
| G01S 3/02 | (2006.01) |
| G01S 3/04 | (2006.01) |
| G06Q 30/02 | (2012.01) |
| G01C 21/20 | (2006.01) |
| G01S 5/02 | (2010.01) |
| G01S 1/68 | (2006.01) |
| G06Q 90/00 | (2006.01) |

(52) U.S. Cl.
CPC .............. *G01S 1/68* (2013.01); *G06Q 30/0239* (2013.01); *G01C 21/206* (2013.01); *G01S 5/0226* (2013.01); *G06Q 90/20* (2013.01); *G01S 5/02* (2013.01)
USPC ............................ 342/463; 342/450; 342/457

(58) Field of Classification Search
USPC ....................... 342/357.06, 357.12, 450, 457, 342/463–465, 357.21, 357.25; 455/456.6, 455/457; 701/213, 215, 410, 412, 468
See application file for complete search history.

(56) References Cited

U.S. PATENT DOCUMENTS

| 7,031,875 B2 | 4/2006 | Ellenby et al. | |
| 2005/0021369 A1* | 1/2005 | Cohen et al. ....................... 705/2 |
| 2006/0163349 A1* | 7/2006 | Neugebauer ................... 235/383 |
| 2007/0032225 A1* | 2/2007 | Konicek et al. ................ 455/417 |

* cited by examiner

*Primary Examiner* — Dao Phan
(74) *Attorney, Agent, or Firm* — Allen D. Hertz, P.A.; Allen D. Hertz

(57) ABSTRACT

The navigation system method described herein could guide people around urban environments, detect guide and navigate them to destinations, add-on to the portable phone. We have focused on the task of detecting and navigating even in situations in which Global Positioning Systems (GPS) cannot provide this information, such as when the person is indoors or in crowded urban areas where there is no line of site to the GPS satellites. The information will be received directly from RF sensors and will display on the existing cellular phone as Bluetooth application.

16 Claims, 8 Drawing Sheets

RF PROXIMITY TAGS PROVIDING INDOOR AND OUTDOOR NAVIGATION AND METHOD OF USE

RELATED APPLICATIONS

This application claims the benefit of US Provisional Application No. US60/678,947 filed May 9, 2005.

FIELD OF THE INVENTION

This invention is directed generally to the field of "location based navigation" and, more particularly, to such method to be used indoors or outdoors without GPS and utilizing a wireless sensor network.

BACKGROUND OF THE INVENTION

Introduction to location based services:

Location based services are rapidly expanding. Outdoor location technologies are mainly based on GPS technologies. GPS cannot perform properly indoors, and is therefore inadequate. As a result, indoor location systems are appearing on the market.

The need for a system, such as the indoor navigation system disclosed herein, arises from various market segments and applications. One example in the market is the GPS based systems that use integrated positioning and navigation systems based on GPS receivers as the primary positioning technology. Subsequent to the events of September 11$^{th}$, the Federal government mandated that GPS capability be built in to all cellular phones. However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

Another important consideration is that GPS itself is susceptible to jamming and other man-made interference.

Description of GPS System.

The Global Positioning System (GPS) is a satellite-based navigation and time transfer system developed by the U.S. Department of Defense. GPS serves marine, airborne and terrestrial users, military and civilian. Specifically, GPS includes the Standard Positioning Service (SPS) that provides civilian users with 100 meter accuracy as to the location or position of the user. For military users GPS provides the Precise Positioning Service that is accurate to within 20 meters. Both of these services are available worldwide with no requirement for any local equipment.

View of GPS limitations:

First limitation of GPS is that upon activation the GPS receiver scans for signals from the GPS satellites. A unit must locate and receive signals from at least four satellites to be able to determine its location. This process of locating the satellites, receiving the data and achieving a position fix can take several minutes. This delay is problematic for many GPS applications.

Second limitation of GPS is that the receiver needs a clear view of the sky to successfully receive signals from the satellites, again under unfriendly RF conditions such as inside buildings, or in "urban canyons" or in the shadows of high buildings, the GPS suffers from multi-path effects and therefore shows poor performance, or none at all.

Third Limitation—limited accuracy: There is a problem of limited accuracy of the civilian GPS signal. While knowing your position to within 50 to 200 feet anywhere on the planet is a major technological feat, it is still not accurate enough, to locate and navigate to an a store in a mall or to empty parking space, where each space measures about 10 feet, and most indoor store/malls are located where the GPS cannot work effectively.

Existing navigation systems, such as the new mandatory GPS equipped cellular phones, are based on GPS and have the aforementioned limitations.

Another significant factor adding to the limitations of the GPS based systems is the important role of map production; normally a user, requires a map to be as detailed and as up-to-date as possible. The existing maps used by the GPS based systems provide limited detail and are not able to reflect changes on a real time basis, more over there is no mapping for indoor facilities at all. The recent introduction of imagery services, such as Google Earth and its competitors, that are offered as an enhancement to GPS at a fee, still provide out of date information, with the unsatisfactory result that users encounter road changes and area development not shown on the maps and imagery.

Application:

In general, the disclosed system is based on applying machine-learning techniques to the task of inferring aspects of the user's status from a stream of input from sensors.

The system focuses on indoor navigation, or navigation in crowded urban areas, where GPS based systems, due to lack of access to satellites or the GPS limitations detailed previously, cannot achieve the required results.

The system have focuses on the task of interactively guiding the user to a desired indoor destination.

Examples of indoor applications:

The user may wish to locate an empty available parking space in his vicinity.

The user may wish to locate a specific store in a shopping mall, or a particular aisle in a department store, or a specific item on a shelf.

The user may wish to locate a specific conference room in a convention center, or a point of interest in an amusement park or a point of interest in a museum.

The user may be looking for a train location in a station, or stops in a subway or underground train system.

PRIOR ART

At the present time, no prior art device utilizes the capabilities to display a real-time representation of navigating directly from the sensors without a central system; and without using a Global Positioning System (GPS) based system directly to the "user". Also most of systems are designed for the old query type search where interface to Internet and or database central system needed.

The system disclosed herein automatically detects a signal directly from the sensors, no communication needed not even cellular communication. Other systems must have bandwidth available, over which to send a request to a central system, or to a database, and then must wait for a response. This takes time!

Even if the other systems have bandwidth, they still based on the existing search concept where under the user submits a query, searches and awaits for the response. All of this is impractical. The system disclosed herein provides the information automatically, without submitting any query, and the response is according to the user's location.

Again, most of the existing prior arts is based on either a GPS based system or an existing GPS based car navigator. And the existing mapping that these systems use has the same limitations described previously and is impractical.

It is believed that the disclosed system and associated method bridges the gap between the GPS based navigation and provides a complete solution.

U.S. Pat. No. 7,031,875 Ellenby et al. describe a pointing system for addressing objects, provide a system and method based on GPS and Internet/database communication, it is not exactly a navigation but a information based system that need the GPS to locate the user location so indoor services is likely out of the question and the need for communication as well with GPS limit its availability and accuracy.

Indoor location technologies.

Various technologies are used for wireless indoor location. These may be classified in two aspects: The algorithm—i.e. the method of location used. The physical layer—i.e. the wireless technology used to communicate with the mobile device.

Location methods

Typically, the methods used in indoor locations are "borrowed" from the outdoor GPS location methods inventory. Specifically, four types of methods are used indoors:

Proximity Detection (PD),
Received Signal Strength (RSSI),
Time of Arrival (TOA), and
Angle of Arrival (AOA).
Proximity Detection (PD)

This method relies upon a dense grid of antennae, each having a well-known position. When a mobile is detected by a single antenna, it is considered to be collocated with it. When more than one antenna detects the mobile, it is considered to be collocated with the one that receives the strongest signal.

This method is relatively simple to implement. It can be implemented over different types of physical media. In particular, IR and RFID are based on this method.

Triangulation

Triangulation takes PD a step further, in the sense that it is based on measuring the signal level measurements from each antenna (possibly by using a triangulation mechanism), with respect to each mobile device. Following that, mobile is located by using a triangulation algorithm.

Like the PD method, triangulation is relatively simple to implement.

Time of arrival (TOA)

TOA is based on triggering the mobile devices to respond, and measuring the time it takes for the response to transmit back to the antenna. The elapsed time represents the distance between the two. By using distances from few antennas, a mobile's position can be triangulated. TOA is considered to be the most accurate method, because multipath effects can be filtered out. Yet, it is considerably more complex to implement, as it requires a modification to the hardware on the mobile side, as well as special modifications on the antenna side.

Angle of Arrival (AOA)

AOA is based on finding the direction of maximal signal intensity for each antenna-device pair. By finding the intersection of several such direction vectors, a mobile's position can be estimated AOA is considerably less accurate than TOA, due to limited angular resolution and the fact that indoors much of the signal is reflected. Also, AOA antennae are more complex, as they require multi-section, highly directional antennas, and multiple RF circuitry.

WLAN (IEEE 802.11b)

This midrange wireless local networking standard, operating in the 2.4 G Hz ISM band, has become very popular in public hotspots and enterprise locations during the last few years. With a typical gross bit rate of 11 Mbps and a range of 50-100 m, IEEE 802.11b is currently the dominant local wireless networking standard.

It is therefore appealing to use an existing WLAN infrastructure for indoor locations as well, by adding a location server. Such solutions do exist in the market, providing an accuracy of approximately two (2) meters.

One limitation of such systems is the fact that WLAN tags are relatively bulky and power hungry. Thus, such locators are mainly useful to locate WLAN enabled instruments, such as portable computers.

Note that in WLAN, antennae are actually part of access points (APs), through which devices communicate with the access network. This is also the case with Bluetooth.

Bluetooth (IEEE 802.15)

Bluetooth is a newer wireless local networking standard, that operates in the 2.4 GHz ISM band. Compared to WLAN, the gross bit rate is lower (1 Mbps), and the range is shorter (typically 10-15 m, although there are tags with a range of over 300 feet). On the other hand, Bluetooth is a "lighter" standard, highly ubiquitous (embedded in most phones, PDAs, PC peripherals, etc.), and supports, in addition to IP, several other networking services. Notably, Bluetooth supports serial port emulation, voice, and various types of object exchange. Bluetooth tags are small, pocketsize transceivers.

Every Bluetooth device's tag has a unique ID. This ID can be used for locating the tag.

Bluetooth indoor location.

How does Bluetooth location work?

Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

There are two approaches to Bluetooth location:

Binary location—a room-oriented approach, uses the PD method. An access point is installed in every way point. For each tag, the system than finds the nearest AP, and respectively indicates its way point location.

Analog location—an X-Y oriented approach, based on the RSSI method. APs are installed more sparsely (typically, 10-15 meters apart). For each tag, the distance from each way point is measured, and the system triangulates the tag's position.

An AP finds a tag by using one of two Bluetooth mechanisms, Inquiry and Paging, that are used normally for link setup:

The Inquiry mechanism—provides a way for a Bluetooth device to discover its neighbor's Bluetooth ID. An inquiry process typically takes 5 seconds. It concludes with the inquirer (typically the AP) having the IDs of all those Bluetooth devices (tags) within its RF range. The relevant location scenario is that of browsing all tags nearby.

The Paging mechanism—following an inquiry, the inquirer can page (set up a link with) one or more of its discovered neighbors. A paging process typically takes 1-2 seconds. This mechanism is faster, but requires a previous knowledge of the tag's ID (as well as the Bluetooth clock phase). The relevant location scenario is that of searching for a certain tag. It is the most accurate and the faster response time and it is the disclosed method in door navigation when and where each tag is known address position—waypoint.

Why use Bluetooth for indoor location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss.

This has two implications:

Availability is high—there is always some signal received by the access point.

AP density can be low—the access points can be placed relatively far apart (typical range is 10-15 meters, i.e. not necessarily of one in each way point).

Bluetooth is ubiquitous—Bluetooth chipsets are being implanted everywhere nowadays (phones, accessories, computing devices, etc).

The fact that a Bluetooth location system can locate any Bluetooth enabled device, makes it more cost-effective. This means that an increasing fraction of humans and mobile assets around would become locatable in a Bluetooth covered site, with no additional hardware cost (no tags attached). The only need is to pre-register these devices. Bluetooth is a low power technology—tags need recharge, approx. once a week (or longer, depends on the usage scenario). Non tags (e.g. Bluetooth enabled phones), are being recharged anyway on a regular basis, so they do not need special recharges. If they are being used for location, the fraction added to their usual (no Bluetooth) power consumption is relatively small.

Bluetooth is a low cost technology—the high expected production volumes (hundreds of millions annually) lead to sub-$5 per chip. This goal has already been met by a few integrated circuit (IC) manufacturers. This would eventually result in a low price for the Bluetooth tags, if and when Bluetooth location systems would become sufficiently ubiquitous. Bluetooth is a multi-functional communication standard-location is only one of the services that can be supported by a Bluetooth infrastructure. The same infrastructure can be used to provide additional network services, particularly remote monitoring and control (by using a serial interface). In addition, Bluetooth provides voice and IP services (although for the later, WLAN is typically more suitable).

In open spaces, relatively free of obstructions and walls (e.g. A large warehouse or a public hotspot), Bluetooth alone would suffice to provide an approximate 2 meter error range.

Conclusion

The Bluetooth technology offers two unique advantages: one is the ability to locate ubiquitous "any tags" (any Bluetooth enabled device that is not a tag, e.g. most of the newer mobile phones). The other advantage is the multiservice nature of the Bluetooth infrastructure that enables using the location access points for other purposes, such as for navigating, remote monitoring and control, and for a variety of IP and messaging services.

SUMMARY OF THE INVENTION

In accordance with the present invention, these are the disclosed system or project's characteristics:

The disclosed system is a navigation method based on the following unique characteristics:

In an indoor or outdoor navigation situation, the associated sensor network, and sensor tags, replaces the satellites in a GPS based system, to provide the user with the information and directions needed to reach the destination.

The disclosed innovation has three major parts:

The navigator, the special method used to display the data and the sensors.

It is not a location and tracking system as offered by other systems.

Small RF tags are installed in each place designated as point of interest, be it at a mall, department store, product inside a store, street or garage parking, inside or outside location, public or commercial. The tags can be RFID (long range type), or a long range Bluetooth, or a Wi-Fi or any RF type. The tags broadcast a unique ID by wireless that identifies the location by the unique ID, the address and type of facility/store. The tag broadcasts its information to be picked up by the navigator, by the cellular phone or any other Bluetooth device application.

The system can serve as add on to the mall/store's guide/mapping to provide extra assistance to user.

The navigator.

The navigator, cellular phone application Bluetooth application

The user will receive the data broadcast by the tags in the vicinity via the interface with a cellular telephone utilizing the cellular phone's Bluetooth capability. It is important to note that no cellular communication or Internet or database access is needed, and that any Bluetooth enabled device will operate the disclosed navigator application as a stand alone device. The disclosed system will interface with existing in-car navigation systems.

The display method.

The display method is the disclosed unique way to bridge existing devices like cellular phones, in-car navigation and other Bluetooth devices. The system provides an overlay navigation display method over the existing navigation system, as a real-time floating display, or as a waypoint to overcome the limitations of GPS based systems and the existing mapping systems.

Mapping can be offered as an additional service. No regenerating of mapping is necessary.

The disclosed navigation system method will enable remote planning based on downloaded local floor-plans, or local navigation, when the location's floor plan can be downloaded at the destination. An example of this would be at the entrance of a shopping mall, department store, amusement park, museum, parking garage or the down town area of a city.

The disclosed system is based on a network of sensors/tags that can be deployed anywhere. The system is accurate to within 10 feet, significantly better existing navigation systems and GPS. The system can work inside a building whereas GPS cannot.

Local detection is obtained via popular Bluetooth interface.

The system provides information about each facility/store, including information about the type of the facility, for example: type of store or product etc.

By providing the ability to locate a the user in an area using a Bluetooth enabled device, or a cell phone with the associated navigation application, the system overcomes the anxiety of "Where will I am" and also facilitates finding a parked car later via the RTP (Return to Parking) feature.

The system has the capability to perform all the functions of a search for and can become the "Next generation search out of the box".

The disclosed system can be an attractive additional feature for cities that intend to deploy WIFI.

In case of an emergency or security situation, the system can provide authorities with information.

The system eases facilitates navigation to indoor locations, without a navigation map or GPS. Mapping background can be provided as an additional feature on the disclosed system. The system provides "local" navigation as well as "remote" detection.

The system allows easy interface with existing networks.

The system saves gas, time, money and eases global warming by reducing the time spent searching for destination.

The disclosed navigation method is unique. The base of the disclosed system utilizes RF tags with interface to Bluetooth enabled devices. This feature allows detection and navigation in locations where GPS cannot work, as well as outside, with the ability to guide the user to within 10 feet of the destination, significantly better than any other navigation and GPS based systems on the market.

The Bluetooth/RF tags are based on a long range version of the popular short distance communication. This unique feature affords the user the ability to plan ahead from a remote location, by obtaining data about the destination directly from the tags and by accessing the indoor floor plan to be navigated at the destination.

A major problem with In-Car navigation and GPS mapping is that they cannot guide the user closer than 50 to 200 feet, and only in open places. The disclosed system can provide accurate directions to within 10 feet.

The disclosed system will be a challenge to navigation providers and GPS providers as they cannot provide mapping or navigation inside a mall, department store, a parking garage or lot, and anywhere the GPS/Navigation map cannot accurately help navigate.

Utilizing the disclosed innovation the facilities in the vicinity around the "user" car are displayed on a floating overlay using either a cellular phone application, or a stand-alone device, or an existing installed navigation system with or without any mapping.

The recent introduction of imagery services, such as Google Earth and its competitors, that are offered as an enhancement to GPS at a fee, still provide out of date information, with the unsatisfactory result that users encounter road changes and area development not shown on the maps and imagery.

Navigation using the mapping or floor-plan of a location can be offered as an additional service. The option of downloading a floor-plan can be exercised either remotely or locally.

The tags broadcast their signal continuously and any of the disclosed navigation devices will detect them and display the data on the user's device in an easy to understand method.

With the disclosed innovation you have the information that you want, when you want it, where you want it. (and at an affordable price).

Once you are in the vicinity of your destination and you switch on your navigation device, you will automatically receive the facility information along your waking route and in all directions around you.

No further action is required, there is no need to send a request or to access the Internet/web or log on and search a database or central system. Other systems must have bandwidth available, over which to send a request to a central system, or to a database, and then must wait for a response. This takes time!

Even if the other systems have bandwidth, they are still based on the existing search concept where under the user submits a query, searches and awaits for the response. All impractical while the user need the information immediately.

The disclosed system provides the information automatically, without submitting any query, and the response takes into account the user's location.

The unique approach of the disclosed system does not need an Internet bandwidth or cellular communication at all.

And as a result there is no delay or waiting for communication and access time, the communication is instantaneous, directly between the tags and the user's navigation device.

Additionally, each facility type can color-coded to identify the type of the store etc., e.g. restaurants, men's wear, women's wear etc.

Each color-coded display of facility can be accessed to obtain complete information about the store e.g., automatic waypoint information.

The ability to operate the disclosed innovation using the associated application on a cellular phone, the navigator, with no need for cellular connection, or on any stand alone Bluetooth enabled device, means the user does not need any GPS system.

Moreover, the disclosed innovation can solve the "RTP" (Return to parking) problem, where many forget where they parked their car. The system has an option to save the location on the "cellular phone-parking detector" application, that will make it easy to locate the parked car.

The disclosed solution is designed for global use and is not limited to malls, stores, amusement parks, museums, sports stadiums etc. It can be implemented in parking garages or parking spaces metered or not, almost anywhere and in any place In the future, all new construction could have the tags included in the design.

The disclosed system integrate the navigation as part of the NAV4 concept where it will provide complete solutions for local navigation in an area where the GPS can't work.

The disclosed system and method consists of three parts:

Part 1. A network of tags/sensors—each in a known location.

The disclosed system is based on navigation to a location, and its aim is to replace or supplement the mall/store guide/map, by installing the tags/sensors in each store or point of interest.

Part 2. The mapping. As GPS and GPS mapping is not available indoors, the disclosed system and method utilizes floor plan mapping available from each facility. For planning ahead, the floor plan can be downloaded to the user's navigation/cellular phone remotely—via the Internet before reaching the destination or locally via Bluetooth when the destination is reached.

Part 3. The Navigation uses the most commonly used device in the world today, the cellular phone with Bluetooth interface. The disclosed system method doesn't need any connection, communication, Internet or central system nor any cellular communication.

As a difference from other systems and other local based systems, the disclosed system offers a unique approach that can be described as the "Search out of the box" as neither query nor database search is needed; all communication is directly between the sensor/tags and the cellular phone, working as a Bluetooth device, that automatically recognizes and takes into account the "user's" location, and provides instant information.

A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

The disclosed system method is part of a broad suite of applications that include a complete solution to the "user" from the time that they park, or begins to look for a space to park their car, walking to the store/mall to when they wants to return to their parked car, looking for the place that they parked.

The suite includes:

Parking detector—and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a point of interest. In an emergency, the first response team has to navigate inside a smoke filled building.

A system and method to provide user information that relates to the point of interest. The disclosed system provides detection and navigation reference, position determination and information related to the object-point of interest, directly and automatically to the user interface-cellular phone without any communication help of Internet/web or cellular needed.

Special operation mode:—Shopping—NAV4SALE—provides navigation to the special sale item in a department store.

Special operating mode:—Museums—NAV4Museums provides navigation and interactive information from the museum's exhibition to the "user's" cellular phone device via Bluetooth interface.

Special operating mode:—Parking—NAV4PARKING provides empty parking space detection and navigation.

Special operating mode:—NAV4STORE provides navigation inside a store/department store to a specific department/aisle or specific product, with option for advertising method and special promotion.

Bluetooth indoor location:

How does Bluetooth location work?

Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

There are two approaches to Bluetooth location:

Binary location—a room-oriented approach, uses the PD method. An access point is installed in every way point. For each tag, the system than finds the nearest AP, and respectively indicates its way point location.

Analog location—an X-Y oriented approach, based on the RSSI method. APs are installed more sparsely (typically, 10-15 m apart). For each tag, the distance from each way point is measured, and the system triangulates the tag's position.

An AP finds a tag by using one of two Bluetooth mechanisms, Inquiry and Paging, that are used normally for link setup:

The Inquiry mechanism—provides a way for a Bluetooth device to discover its neighbor's Bluetooth ID. An inquiry process typically takes 5 s. It concludes with the inquirer (typically the AP) having the IDs of all those Bluetooth devices (tags) within its RF range. The relevant location scenario is that of browsing all tags nearby.

The Paging mechanism—following an inquiry, the inquirer can page (set up a link with) one or more of its discovered neighbors. A paging process typically takes 1-2 seconds. This mechanism is faster, but requires a previous knowledge of the tag's ID (as well as the Bluetooth clock phase). The relevant location scenario is that of searching for a certain tag. It is the most accurate and the faster response time and it is the method in door navigation when and where each tag is known address position—waypoint.

Why use Bluetooth for indoor location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss. This has two implications:

Availability is high—there is always some signal received by the access point. AP density can be low the access points can be placed relatively far apart (typical range is 10-15 meters, i.e. not necessarily of one in each way point).

Bluetooth is ubiquitous—Bluetooth chipsets are being implanted everywhere nowadays (phones, accessories, computing devices, etc). The fact that a Bluetooth location system can locate any Bluetooth enabled device, makes it more cost-effective. This means that an increasing fraction of humans and mobile assets around would become locatable in a Bluetooth covered site, with no additional hardware cost (no tags attached). The only need is to pre-register these devices.

Bluetooth is a low power technology—tags need recharge, approx. once a week (or longer, depends on the usage scenario). Non tags (e.g. BT enabled phones), are being recharged anyway on a regular basis, so they do not need special recharges. If they are being used for location, the fraction added to their usual (no Bluetooth) power consumption is relatively small.

Bluetooth is a low cost technology—the high expected production volumes (hundreds of millions annually) lead to sub-5$ per chip. This goal has already been met by few IC manufacturers. This would eventually result in a low price for the Bluetooth tags, if and when Bluetooth location systems would become sufficiently ubiquitous.

Bluetooth is a multi-functional communication standard-location is only one of the services that can be supported by a Bluetooth infrastructure. The same infrastructure can be used to provide additional network services, particularly remote monitoring and control (by using a serial interface). In addition, Bluetooth provides voice and IP services (although for the later, WLAN is typically more suitable).

In open spaces, relatively free of obstructions and walls (e.g. A large warehouse or a public hotspot), Bluetooth alone would suffice to provide an approximate 2 meter error range.

Waypoint Navigation

A waypoint is a fixed location with known address location, longitude and latitude and coordinates. The disclosed navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enabling users to locate a destination on a map and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them it, it is easy to determine the "user's" exact location.

Map Matching

The navigation solution is further enhanced, although it is not essential, when the system knows that the person or object being located is traveling along known routes on a map; for example, the system can assume that people can only follow certain routes in a mall. This is priori information that can be used to "force" the estimated position to be on the nearest point on the possible routes. The constraints of indoor construction similarly can be used to refine estimates of the position of a person or object moving within a building-people and objects do not pass through walls, they pass along corridors and through doorways. It is a best solution for a system in case of an emergency or for a system for homeland security or a system to locate and inform the subway location, a good example is the hotel exit floor map.

Configuration and Use

In the disclosed indoor application, instead of GPS, the disclosed system uses known waypoint positions that are manually detected and identified as a demonstration of the concept of using another sensing method, such as RFID, to detect and identify the waypoints. Theoretically, it would be possible to convert the waypoint positions into GPS coordinates and emulate an external GPS data source.

This system can be useful for providing navigation to first responder personnel indoors. waypoints have been installed in a particular building in the form of RFID tags whose identities are associated with locations, then it may be possible to associate magnetic anomaly information with individual tags as well.

One of the important features of the disclosed indoor navigation techniques will enhance the ability of tactical team's first response team to navigate within the buildings in which it has been deployed. RF (Bluetooth) Tag/Sensor devices commonly are attached to persons or to moveable objects so that the objects can be tracked using fixed readers (special-purpose radios) at different locations. This is the most common indoor navigation that exists today. The disclosed method is the "flip side" of this practice and is based on the concept that the detection of an RF (Bluetooth) device, or RF Tags, in a known, fixed location, by a moving reader, such as a Bluetooth enabled cellular phone or other Bluetooth enabled device, provides a precise location of a person or a moving object, by the carrier of the telephone or device, who can supply indoor navigation without GPS.

The disclosed method provides a low-cost, reliable system for firefighters and other first responders, inside buildings, to navigate, where a GPS is not reliable-indeed, the GPS signal may have been disabled temporarily to prevent-exploitation by terrorists, or even more likely no signal can be received at all inside a building.

The disclosed system envisions this limitation of GPS based systems, and is intended for an environment that is potentially much less "friendly" to RF signals, the environment inside a building that first responders encounter may contain smoke, dust, or flames, and is intended to leverage advances in ubiquitous RF/Bluetooth tag technology. The disclosed system will exploit the capability of storing critical building information, such as the floor maps and the emergency escape plans, for retrieval and navigational assistance via a Bluetooth enabled cellular phone, when and where it is needed.

More over the disclosed system can serve as a navigator for the emergency exit route when and where needed each user can load the emergency exit floor plan and escape with the knowledge of his exact location in that route.

Aspects of the scenarios to be included:

Identifies and tracks the user (a first response team member).

Provides the user with navigation information and directions for safely exiting of the building.

Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. The disclosed solution focused on technology already in place that simply needs to be expanded.

With the implementation of the disclosed system, a FIRST RESPONSE TEAM will be empowered to navigate and find its way in a case of emergency or a disaster. This capability can be a critical life saving power in modern congested urban living conditions, not available before now.

It is believes that implementation of the disclosed our system will assist counter terrorism activities and more importantly will help the first response teams to save the lives of people trapped inside buildings.

Conclusion

The Bluetooth technology offers two unique advantages: one is the ability to locate ubiquitous "any tags" (any Bluetooth enabled device that is not a tag, e.g. most of the newer mobile phones).

The other advantage is the multiservice nature of the Bluetooth infrastructure that enables using the location access points for other purposes, such as for navigating, remote monitoring and control, and for a variety of IP and messaging services.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
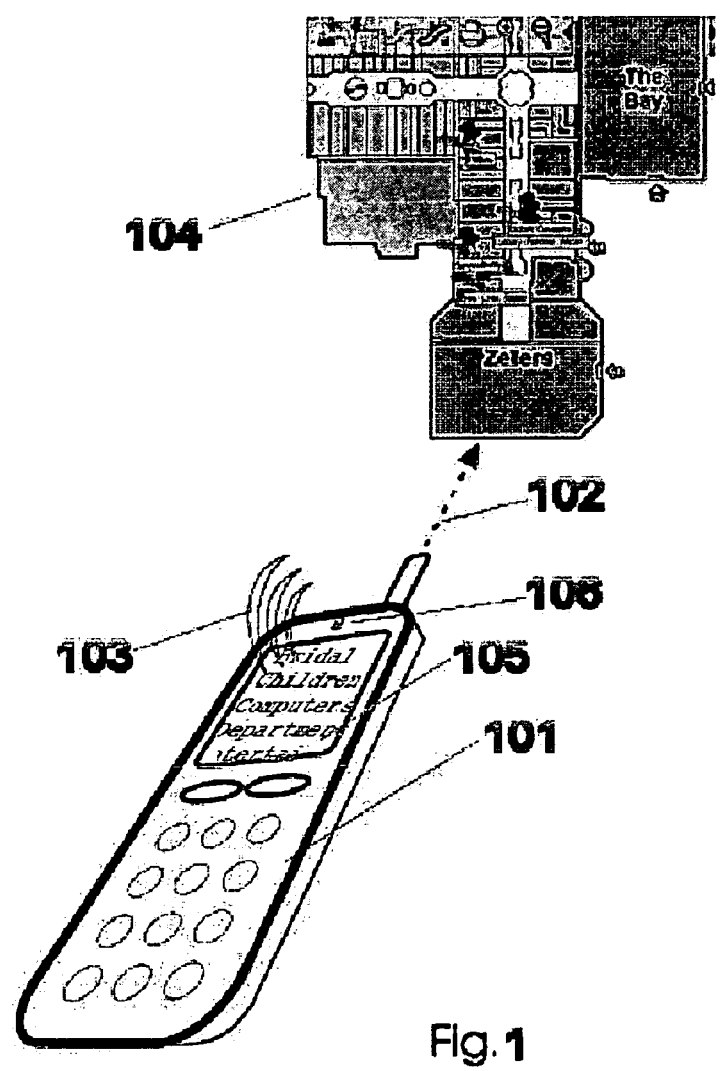
FIG. 1 is an illustration of the portable phone navigation method as application on a cellular phone in accordance with the present invention.

In all the figures of the drawings, sub-features and integral parts that correspond to one another bear the same reference symbol.

Referring now to the drawings in detail and first particularly to FIGS. 1-8 thereof.

These figures illustrate the method and system to navigate indoor without GPS using sensor in a network utilizing Bluetooth application on a cellular phone.

Referring to FIG. 1 This shows the cellular phone 101 with a floating display of information 105 received directly from sensors/tags 107 installed in this illustration in a mall facility 104 the only communication is between the sensors 107 and directly to the cellular phone 101 via a Bluetooth communication 102 where no cellular or any other connection needed at all. The system uses the cellular phone 101 as a Bluetooth enable device. The application will receive a signal directly from the sensor/tags 107 installed at the facility and allow to calculate and determine the exact location of the "user" and will allow navigation in the facility when the navigation display 105 of the application will be floating on the floor map of the facility that can be down load ether remotely before accessing the facility or locally via Bluetooth 102 when reaching the area.

Each sensor 107 represents a waypoint and will be shown with a simple color code to identify the type of the facility e.g. type of store.

When the user approaches a sensor/tag/way point 107 he will be able to receive additional-information regarding the store/product on his cellular phone/Bluetooth device 101 e.g. special promotions, coupons, advertising or special sales to the display 105 etc.

The promotion can be also delivering via Bluetooth voice option 106.

Figure 2:
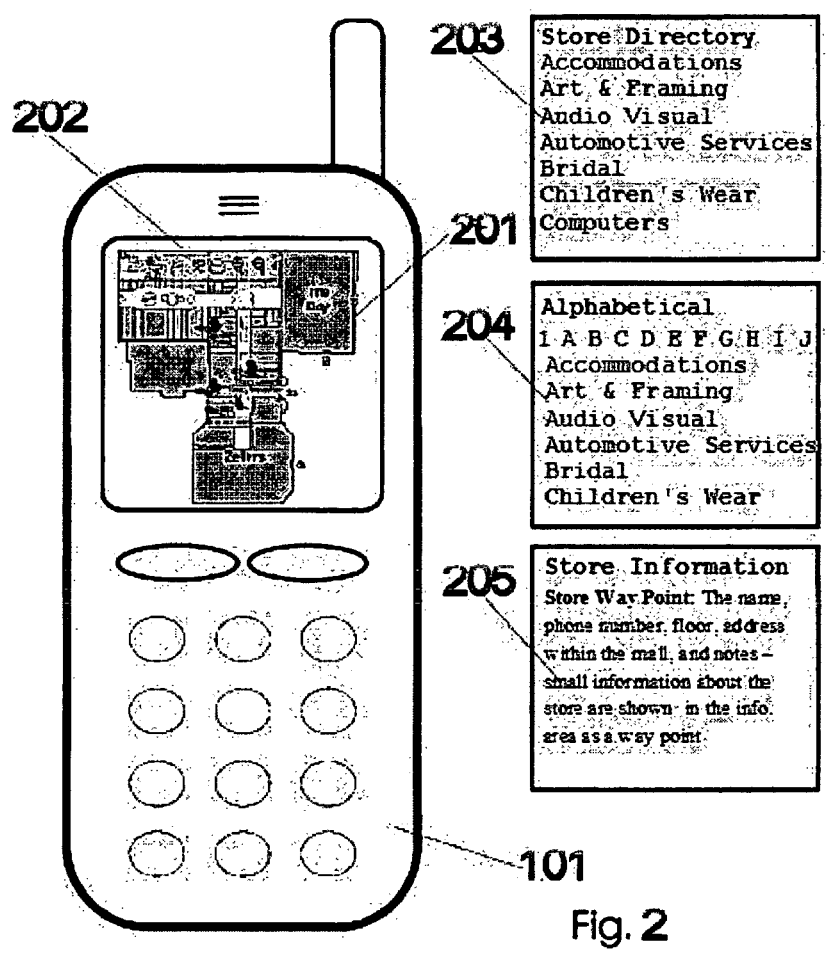
FIG. 2 is illustration of the portable phone navigation as an application nav4 mall/store in accordance with the present invention.

Referring to FIG. 2. This figure illustrate the cellular navigation application in a mall on a cellular phone, 101, as a Bluetooth cellular phone application; again, there is no need for cellular communication or any internet web communication or any central system nor any access to a database.

The system utilizes the cellular phone, 101, only as a Bluetooth enabled device and the application overlay floating display over the floor map 201 where each store sensor/tag 202 represented as a waypoint, in this illustration the mall's store can be view and be search by store type, store directory 203, or by alphabetical order 204, where each store/waypoint will have a basic information—store information 205, like the store name, phone number, floor, address within the mall, and a small notes—small information representing the store. Again when the user approaches a sensor/tag/way point 202 he will be able to receive additional information regarding the store/product on his cellular phone/Bluetooth device 101 e.g. special promotions, coupons, advertising or special sales to the display 201 etc.

The promotion can be also delivering via Bluetooth voice option utilize the Bluetooth options.

Figure 3:
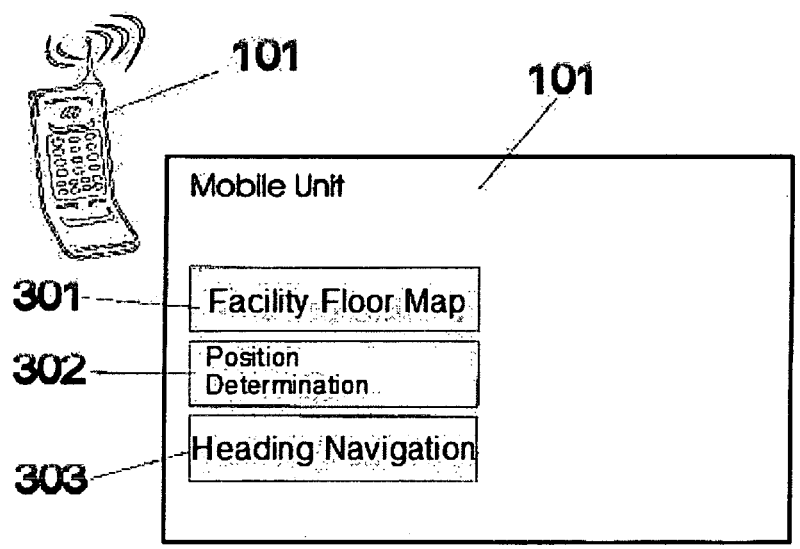
FIG. 3 is illustration of the mobile unit application system in accordance with the present invention.

Turning now to FIG. 3. This figure shows the cellular phone mobile unit 101, in operation as a Bluetooth application, the procedure is firs to load the facility floor map 301, which can be done remotely as a planning via Internet or web site before reaching the area to be navigate, or locally via Bluetooth connections at the facility, most likely at the entrance. After loading the floor map to be a background for the navigation a position determination 302, done by calculating the signal receiving directly from the sensor/tags and then provide the heading navigation 303, and the current user location on the floor map, 301.

Figure 4:
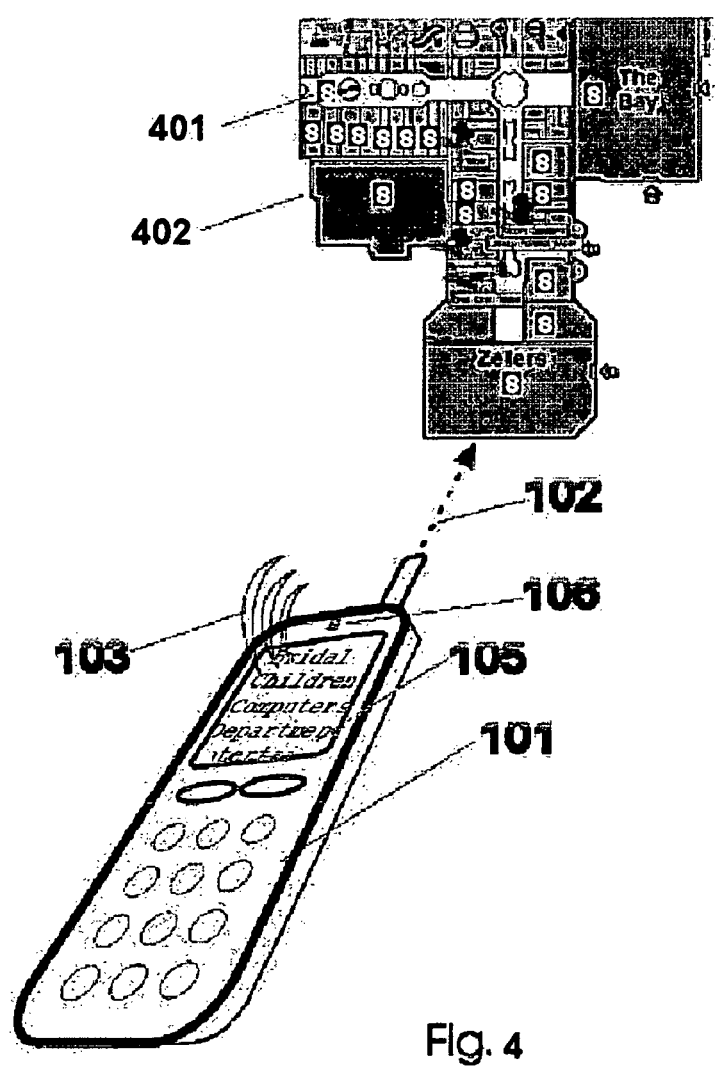
FIG. 4 is an illustration of the sensor tags in a network implement in a mall environment in accordance with the present invention.

Referring to FIG. 4. This figure shows an illustration of the mall 402, when each store represented by sensor/tag waypoint 401, in this illustration the mall's store can be view and be search by store type, store directory, or by alphabetical order, where each store/waypoint 401, will have a basic information—store information, like the store name, phone number, floor, address within the mall, and a small notes—small information representing the store. Again when the user approaches a sensor/tag/way point 401 he will be able to receive additional information regarding the store/product on his cellular phone/Bluetooth device e.g. special promotions, coupons, advertising or special sales to the phone as Bluetooth application.

The promotion can be also delivering via Bluetooth voice option utilize the Bluetooth options.

Figure 5:
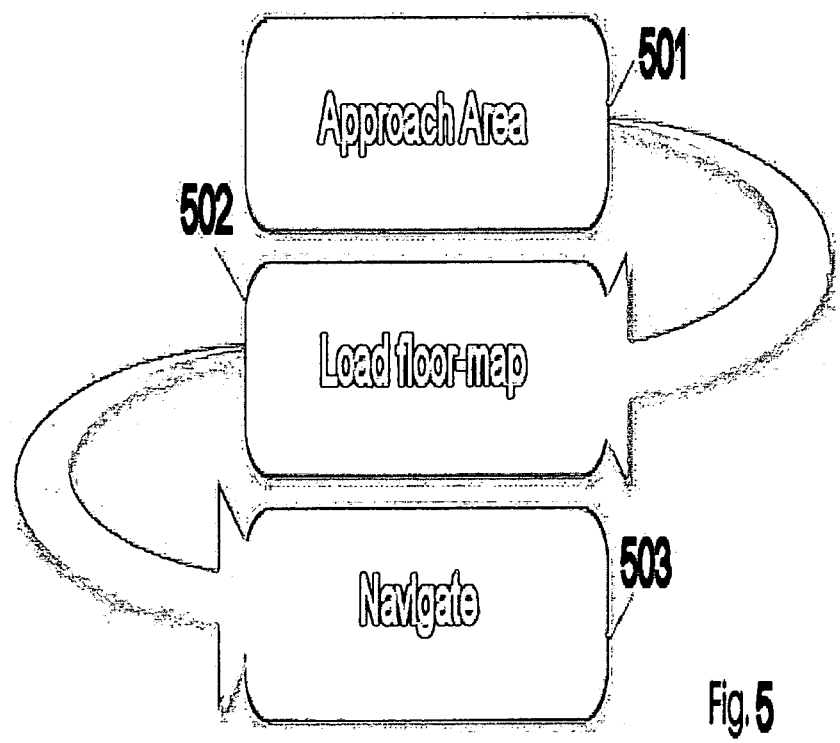
FIG. 5 is a flow diagram of the navigation system in accordance with the present invention.

Turning to FIG. 5. This figure shows the method of the disclosed system when the user reach the area 501, locally load the floor mapping 502, and navigate on the facility mapping 503.

Figure 6:
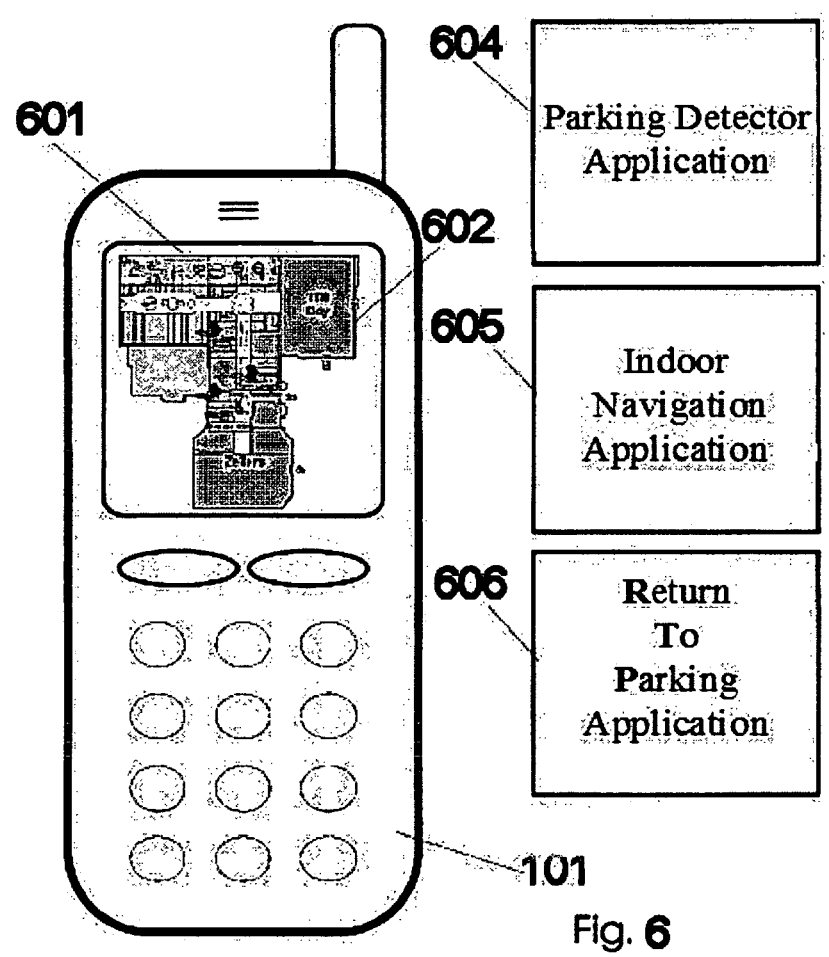
FIG. 6 is an illustration of the indoor navigation system in accordance with the present invention.

Referring to FIG. 6. This figure shows an illustration of the disclosed navigation suite of application where the navigation is a cellular phone 101, as a Bluetooth device navigate on a background floor map of the facility 602, receiving a detect information and determination of the exact location of the user from a sensor base network implement in each known location like 601, store in a mall, the application in the disclosed suite of software to provide a navigation indoor or in a places where and when GPS signal is not available or not efficient to provide accurate to a waypoint/store, place:

Parking detector application 604, describe as a system and method to find an empty parking space from a sensor base network directly to the cellular phone utilize the cellular phone Bluetooth and no other communication needed.

Figure 8:
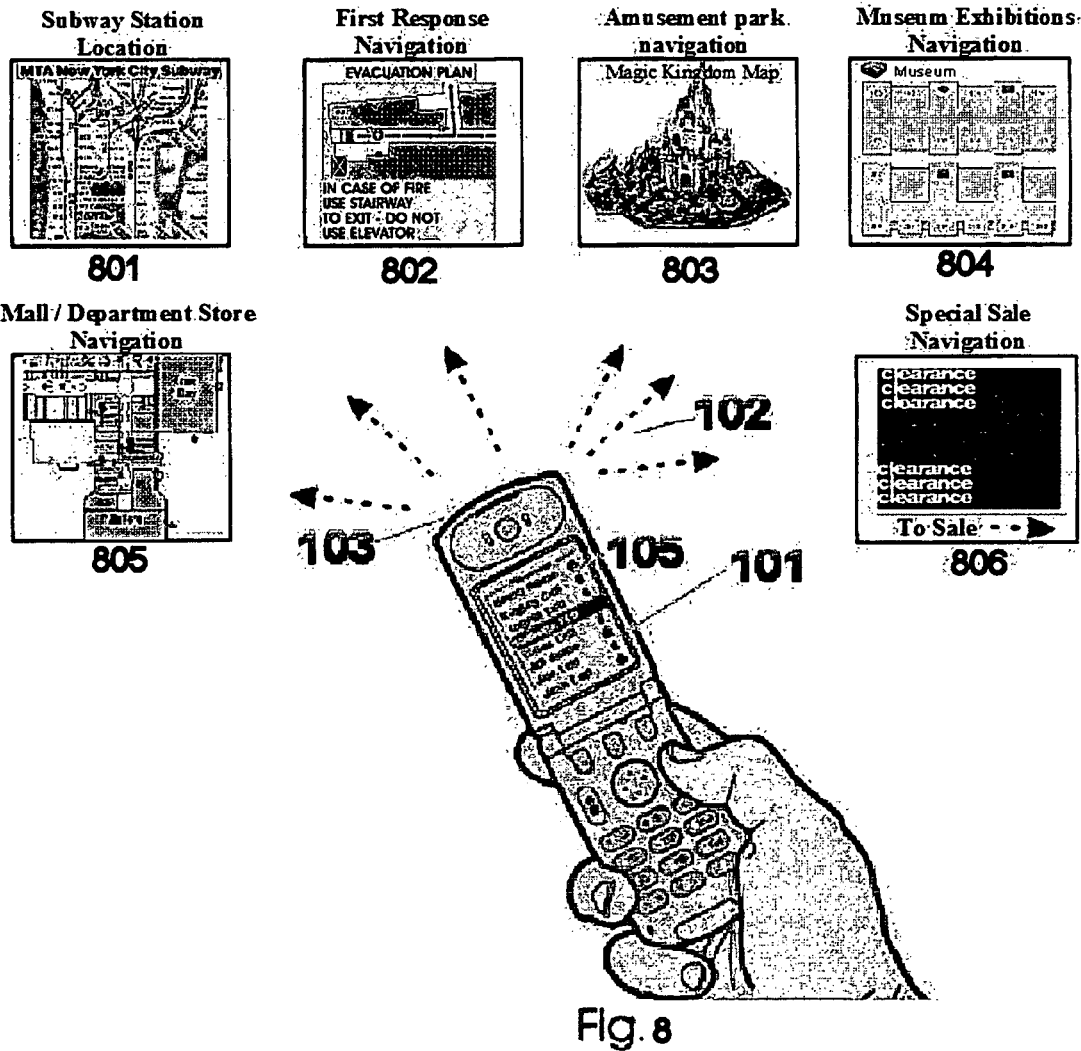
FIG. 8 is an illustration of the possibility application for the disclosed navigation system in accordance with the present invention.

Indoor navigation application 605, under Nav4 application that will describe in more details in FIG. 8 A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

RTP 606—returns to parking—locates the place that you parked your car.

The disclosed system and associated method of use is part of the disclosed broad suite of applications that include a complete solution to the "user" from the time that he parks, or begins looking for a space to park his car, walking to the store/mall to when he wants to return to his parked car, looking for the place that he parked.

The suite includes:

Parking detector—and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product. A shopper in a department store asks for a specific department.

A pedestrian asks the way to a point of interest. In an emergency, the first response team has to navigate inside a smoke filled building.

A system and method to provide user information that relates to the point of interest. The disclosed system provides detection and navigation reference, position determination and information related to the object—point of interest, directly and automatically to the user interface—cellular phone without any communication help of Internet/web or cellular needed.

Figure 7:
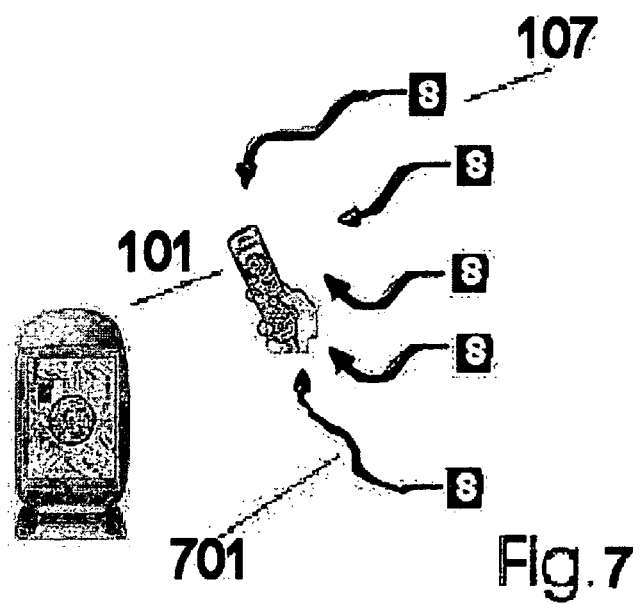
FIG. 7 is an illustration of the sensor tags in a network in accordance with the present invention.

Turning to FIG. 7. the sensor base network 107, is show and illustrate the direct broadcasting RF information 701, to the cellular phone as a Bluetooth device 101, again, there is no need for cellular communication or any Internet web communication or any central system nor any access to a database.

Turning to FIG. 8, is an illustration of the possibility application for the disclosed navigation system The Nav4 indoor application: some of the possibilities of application are:

Special operation mode:—Shopping—NAV4SALE—806, provides navigation to the special sale item in a department store, coupons or other promotions and even audio or video via a Bluetooth interface as advertising directly push from the waypoint/store area to the user Bluetooth device/cellular phone.

Special operating mode:—Museums—NAV4Museums—804, provides navigation and interactive information from the museum's exhibition to the "user's" cellular phone device via Bluetooth interface, utilizing the Bluetooth the user can receive even audio and video information and there is no need to have a rental headset or additional information.

Special operating mode:—NAV4STORE—805, provides navigation inside a store/department store to a specific department/aisle or specific product, with option for advertising method and special promotion.

Special operating mode:—Amusement park—803, NAV4disney provides navigation and interactive information from amusements park exhibition to the "user's" cellular phone device via Bluetooth interface. Will provide navigation on the amusement map, the exhibition as a waypoint to provide information like schedule of show, availability (lines) time to the show, type of the waypoint like restrooms, food area etc. more over the disclosed navigating system method can provide also a user locating when and where there is need to locate the user/kid for example in the amusement park.

Special operating mode:—First response navigation, 802—More over the disclosed system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

Special operating mode:—NAV4Train-801, provides The user with ability to know his exact location in the train, subway station on a route directly to his phone as a Bluetooth device, more over the train/subway/underground map will be the basic for the background navigation and will show the user his location in the train/subway route, no more walking to the mapping inside the station or try to figure out your location in the map inside the subway train, each station will have a tag/sensor all the route to provide the user accurate locating and additional information that he may need like schedule, restroom, food, emergency etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

I claim:

1. A method for determining a position of a display device within a facility area and providing navigation thereto, wherein navigation is provided on said display device, wherein said display device is selected from a group consisting of a portable display device, a mobile phone, a hand held navigation system, a car navigation system and a Bluetooth enabled device, the method comprising steps of:
   a) uploading an application onto said display device, wherein said application provides a mobile user with guidance and navigation about said local area, including said facility area,
   b) downloading a facility indoor mapping of a local floor plan associated with said facility area to said display device prior to arriving to said facility area,
   c) determining a current position of said display device by a proximity of said display device to RF tags installed in known positions in said facility area, wherein said RF tags emit at least one of a Bluetooth signal and a Wi-Fi signal, wherein said step of determining said current position is accomplished by at least one of: utilizing a location reference of said RF tags when said display device receives a signal from a single RF tag and utilizing a triangulation calculation when said display device receives signals from multiple RF tags,
   d) displaying a position marking representative said position of said display device within said facility area on a display device overlay layered over said facility area map,
   e) navigating using said positions of said tags as displayed on said facility area maps,
   f) displaying additional local based information on said display device, wherein said additional local based information includes information associated with elements within a vicinity of said facility area.

2. The method according to claim 1, further comprising a step of delivering local based services content to said display device, wherein said local based services content includes content information that is associated with a location of said display device.

3. The method according to claim 1, further comprising steps of availing and making use of an indoor local base services application on said display device, said indoor local based services application comprises at least one of:
   a) map and indoor guide and navigation—obtaining a local area map and application,
   b) directory—obtaining at least one of a store/mall directory, a local area directory, a store type, and store information as part of—said local mapping information to said display device,
   c) search and find—searching and locating at least one of a store, a place, an item, and a product, wherein said at least one of said store, said place, said item, and said product is associated with said at least one of said store/mall directory, said local area directory, said store type, and said store information, d) sales/specials—obtaining at least one of a discount, a sale, and a coupon, presenting said at least one of said discount, said sale, and said coupon and providing store aisle navigation upon said display device, wherein said store aisle navigation directs said user to a store aisle containing an items associated with said at least one of said discount, said sale, and said coupon, e) parking—determining available parking spaces in a vicinity of said display device and providing navigation to said user by displaying available parking spaces on said display device, wherein said parking spaces are associated with said location of said RF tag, f) return to parking—identifying a location of a parked car associated with said display device and providing navigation to return said user to said location of said parked car through a display on said display device, wherein a parking space containing said parked car is associated with said location of said RF tag, g) info—provide information about events, restrooms, ATM location, seating area, Kids playground, fountain, public phones, h) emergency—obtaining emergency information and emergency navigation associated with said facility area, and displaying said emergency information and emergency navigation associated with said facility area on said display device, wherein said emergency navigation is based upon at least one of said location of said display device and said location of said RF tag, and i) panic—emitting a panic alert, wherein said panic alert requests.

4. The method according to claim 1, further comprising a step of displaying additional information associated with at least one waypoint, wherein said additional information includes at least one of a store, a department, a special sale, an event, and a coupon, wherein said information is updated in real time.

5. The method according to claim 1, further comprising a step of navigating between waypoints illustrated on said local floor plan of said facility indoor mapping using said application displaying said known waypoints, wherein at least one of said facility indoor mapping and said waypoints associated with RF tags that are in a proximity of said display device at said facility.

6. The method according to claim 1, further comprising a step of determining a location of said display device indoor without aid of a global positioning satellite (GPS) system.

7. The method according to claim 1, further comprising a step of providing said display device with application software for navigating using a display including at least one of a area map and a facility floor plan.

8. The method according to claim 1, further comprising a step of providing navigation to a pedestrian within an environment within a facility selected from a facility group consisting of: a mall, a department store, a specialty store, a conference, a trade show, an amusement park, a stadium, an arena, a sporting event, a university, a hospital, a school, a municipal building, a museum, a subway, a train station, an airport, a down town center, a cruise ship, a financial banking location, a parking facility and a covered structure.

9. The method according to claim 1, further comprising at least one of:
a step of determining available empty parking spaces in a vicinity of said display device and providing navigation to said user by displaying available parking spaces on said display device, wherein said parking spaces are associated with said location of said RF tag, and steps of identifying a location of a parked car associated with said display device by associating a parking space containing said parked car with one RF tag and navigating said user to said parking space containing said parked car by referencing said RF tag associated with said parking space containing said parked car one through a display on said display device, thus providing a return to parking feature.

10. The method according to claim 1, further comprising a step of providing an indoor guide and navigation within one of: a museum, within a show, a conference, and an exhibition, wherein guide and navigation information is determined by an RF tag identifier of said RF tag located proximate to a location of said display device, wherein said guide and navigation is provided to said user by at least one of audio, video, and content information using said display device.

11. The method according to claim 1, further comprising a step of providing a local guide and navigation specifically associated with real estate, identifying local property that is available for at least one of sale, lease, and rent, wherein said real estate information is determined based upon said location of at least one of said display device and said location of said RF tag.

12. The method according to claim 1, further comprising steps of providing guidance and navigation associated with an amusement park having waypoints identifying specific points of interest within said amusement park, and
displaying information associated with said amusement park including at least one of a schedule of show, wait times for a show, time to said show, a restroom location, a food service area and a process for reducing a wait time for access to a show or attraction.

13. The method according to claim 1, further comprising a step of providing navigation for an emergency exit route utilizing a location of at least one of said display device and said location of said proximate RF tag within said facility area to determine said emergency exit route and providing updated guidance for directing a user to safely exit said facility area.

14. The method according to claim 1, further comprising steps of:
providing a display device with a current location of at least one of: a train, a bus, and a subway train on a route directly to said display device, wherein said current location of at least one of said train, said bus, and said subway train is displayed upon a train/subway/underground map,
presenting the display device location in said route, and
presenting additional information including at least one of a schedule, a restroom location, a food serving location, and an emergency route, wherein said additional information is determined by said RF tag identifier of said RF tag located proximate to said display device.

15. A method for determining a current position of a display device and providing road sign information to said display device, the method comprising steps of:
determining said current position of said display device by utilizing a proximity of said display device to RF tags installed in known positions in a regional area, wherein said step of determining said current position is accomplished by at least one of:
a) utilizing a location reference of said RF tags when said display device receives a signal from a single RF tag,
b) utilizing signal strengths of said RF tags when said display device receives signals from multiple tags, and
c) utilizing a triangulation calculation when said display device receives signals from multiple tags;

obtaining and displaying road sign locations upon a local map collectively displayed upon one of said display device, a vehicle display, wherein said road sign locations are determined by said an RF tag identifier of said RF tag located proximate to said display device, wherein said information is provided through an interface between said display device and a vehicle computer operating a vehicle display; and in a condition where a road sign affects a speed, the method proceeds in alerting a driver to adjust a speed of said vehicle in accordance with a speed change associated with said road sign located within a vicinity of said display device.

16. A method for determining a current position of a display device and providing location based service (LBS) application and information content to said display device, the method comprising steps of:

determining said current position of said display device by utilizing a proximity of said display device to RF tags installed in known positions in a facility area, wherein said step of determining said current position is accomplished by at least one of:

a) utilizing a location reference of said RF tags when said display device receives a signal from a single RF tag,
b) utilizing signal strengths of said RF tags when said display device receives signals from multiple tags, and
c) utilizing a triangulation calculation when said display device receives signals from multiple tags;

providing a local business with information about customer behavior habit without compromising user ID or privacy;

providing said location based service (LBS) application and information content based on at least one of a location of a user as determined by at least one of said position of said display device and said location associated with an RF tag identifier, a behavior habit obtained from said display device, and a profile provided by data obtained from said display device, wherein said LBS and information content comprises at least one of: a special, a sale, and a promotion events coupon; and designating a business as a waypoint and presenting advertisements associated with the business on the display device.

* * * * *